US008819327B2

(12) United States Patent
Hartwich

(10) Patent No.: US 8,819,327 B2
(45) Date of Patent: Aug. 26, 2014

(54) COMMUNICATION SYSTEM HAVING A CAN BUS AND A METHOD FOR OPERATING SUCH A COMMUNICATION SYSTEM

(75) Inventor: Florian Hartwich, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 505 days.

(21) Appl. No.: 12/811,510

(22) PCT Filed: Mar. 4, 2009

(86) PCT No.: PCT/EP2009/052527
§ 371 (c)(1),
(2), (4) Date: Jul. 1, 2010

(87) PCT Pub. No.: WO2009/109590
PCT Pub. Date: Sep. 11, 2009

(65) Prior Publication Data
US 2010/0293315 A1    Nov. 18, 2010

(30) Foreign Application Priority Data

Mar. 7, 2008    (DE) .......................... 10 2008 000561

(51) Int. Cl.
*G06F 13/36*    (2006.01)
*G06F 13/40*    (2006.01)

(52) U.S. Cl.
CPC ................................. *G06F 13/4027* (2013.01)
USPC ....................................................... 710/315

(58) Field of Classification Search
USPC ....................................................... 710/315
See application file for complete search history.

(56) References Cited

U.S. PATENT DOCUMENTS

| 5,448,561 | A  | * | 9/1995  | Kaiser et al. .................. 370/471 |
| 5,670,845 | A  | * | 9/1997  | Grant et al. ...................... 315/77 |
| 6,882,924 | B2 | * | 4/2005  | Miller ............................ 701/100 |
| 7,299,098 | B2 |   | 11/2007 | Gruenewald et al. |
| 7,424,361 | B2 |   | 9/2008  | Masuda et al. |
| 7,882,298 | B2 | * | 2/2011  | Aue .............................. 710/316 |
| 2007/0056780 | A1 | * | 3/2007 | Jaenke et al. ................ 180/65.1 |

FOREIGN PATENT DOCUMENTS

| CN | 1620058      | 5/2005  |
| DE | 202006007689 | 9/2007  |
| DE | 102007016620 | 11/2007 |
| EP | 1798936      | 6/2007  |
| JP | 2003-162303  | 6/2003  |
| JP | 2005-58175   | 3/2005  |

* cited by examiner

*Primary Examiner* — Raymond Phan
(74) *Attorney, Agent, or Firm* — Kenyon & Kenyon LLP

(57) ABSTRACT

A communication system having one CAN bus and at least two devices interconnected by the CAN bus is described, at least one of the devices including: i) a CAN controller, which is suitable for transmitting CAN data frames over the CAN bus using a first physical protocol in a first operating mode; ii) an asynchronous serial communication interface unit, which is suitable for transmitting ASC data frames over the CAN bus using a second physical protocol in a second operating mode; iii) a first switching means, which is suitable for switching the first operating mode and the second operating mode depending on at least one agreement in effect between the device and at least one of the other devices; and iv) another switching means, which is suitable for switching the device to a third (restricted) operating mode, which differs from the first operating mode and the second operating mode, for powering up the device.

12 Claims, 5 Drawing Sheets

COMMUNICATION SYSTEM HAVING A CAN BUS AND A METHOD FOR OPERATING SUCH A COMMUNICATION SYSTEM

FIELD OF THE INVENTION

The present invention relates to a communication system having a CAN (controller area network) bus and a method for operating such a communication system.

BACKGROUND INFORMATION

In transmission of data over a CAN bus, the maximum capacity utilization of the bus in practice is usually approximately 50%. Among other things, this is due to the protocol overhead of the physical protocol required by the CAN bus, i.e., the header part of CAN messages may be larger than the useful data part or payload part of the message. For example, if the DLC (data length code) is 8, then 64 payload bits and 1+12+6+16+2+7=44 header bits are provided. The ratio may be worsened by stuff bits.

In addition, the maximum feasible transmission rate of a CAN bus at the present time is limited to approximately 1 Mbit/sec ($10^6$ bits per second) due to physical boundary conditions and in particular due to delays on the CAN bus. This corresponds to a minimum bit time of 1 μsec ($10^{-6}$ seconds). At a higher transmission rate, problems may occur in CAN bit arbitration which prevents collisions among messages, because the signal transit times between the most widely spaced nodes may exceed a bit time. Furthermore, a high transmission rate results in steeper flanks of the transmitted signal, which in turn results in higher radiant emittance and thus poorer EMC properties of the communication system.

SUMMARY

A communication system according to an example embodiment of the present invention and an example method according to the present invention for operating the communication system may each have an advantage that the devices, which are interconnected via the CAN bus, are suitable for transmitting CAN data frames over the CAN bus in a first operating mode and for transmitting ASC (asynchronous serial communication) data frames in a second operating mode.

An advantage of the example embodiment of the present invention is that the ASC data frames are transmissible at a higher bus clock rate over the CAN bus in comparison with the CAN data frames. Furthermore, the ASC data frames have a much smaller header portion and thus a much larger useful data portion in comparison with CAN data frames. Thus, in an ASC data transmission, a very high useful data transmission rate is achievable because the protocol overhead is particularly small. In particular, the protocol overhead may be reduced from approximately 55% with CAN data frames to approximately 10%.

According to the present invention, a communication system having one CAN bus and at least two devices coupled by the CAN bus may be provided. Such a device has a so-called CAN controller, an asynchronous serial communication (ASC) interface unit, and a switch.

The particular CAN controller is suitable for transmitting CAN data frames over the CAN bus using a first physical protocol in a first operating mode or transmission mode. The ASC interface unit is suitable for transmitting ASC data frames over the CAN bus using a second physical protocol in a second operating mode or transmission mode. The switching means is equipped for switching between the first transmission mode and the second transmission mode, depending on at least one agreement in effect between the particular device and at least one additional device. The first and second physical protocols are preferably different.

For powering up at least one device connected to the CAN bus, it is switched during power-up to a third operating mode, which is different from the first operating mode and from the second operating mode. Switching the device to the third operating mode may be necessary if the device is to be powered up again as a single device after a crash, for example, and must be synchronized to the communication link over the CAN bus or when the device together with all the other devices connected to the CAN bus is powered up at start-up of the communication system. The third operating mode (so-called restricted mode) is selected so that the device has only a limited functionality. In particular, the ASC data frames transmitted by the device in the third operating mode during certain time slots of the communication cycle (so-called basic cycle) are not destroyed. This may be achieved by transmitting neither error frames (or error flags) nor overload frames (or overload flags) at the dominant bus level. The CAN protocol stipulates that a CAN node, which receives a dominant bit in the intermission after a data frame, must respond to it with an overload flag. This looks like an active error flag even when the node is error-passive. The overload function is therefore also suppressed in restricted mode.

This prevents ASC data frames, which have been properly transmitted in the ASC time slot, from being destroyed by the device to be powered up only because the device does not yet have any knowledge of the time slot in which ASC data frames are transmitted and it interprets the ASC data frames incorrectly as faulty CAN data frames. The device is able to receive knowledge of when, i.e., in which time slot, ASC data frames are transmitted, only when it has synchronized itself to the time base of the communication system. Furthermore, an error counter of the device is frozen for the duration of the third operating mode, i.e., it is not incremented. This may be true of the transmit (Tx) error counter as well as the received (Rx) error counter. This prevents ASC data frames transmitted in the ASC time slot from resulting in a rapid incrementation of the error counter and the device being switched to an "error_passive" state (error level 128 exceeded: device does not transmit any error frames, forced pause before renewed transmission of messages) and/or a "bus_off" state (error level 256 exceeded: device is not allowed to send) before the device is synchronized to the time base of the communication system. In other words, in the third operating state, the device is able to recognize presumably faulty data, i.e., data not conforming to the CAN protocol, but this does not result in incrementation of the error counter and/or destruction of the presumably defective data frames.

In addition, a method for operating a communication system having a CAN bus and at least two devices interconnected via the CAN bus may be provided, including the following steps:
a) switching at least one of the devices among the various operating modes,
b) a CAN controller of the device being suitable for transmitting CAN data frames over the CAN bus using a first physical protocol in a first operating mode, and
c) an asynchronous serial communication (ASC) interface of the device being suitable for transmitting ASC data frames over the CAN bus using a second physical protocol in a second operating mode, and d) the device being switched to a third operating mode, which differs from the first operating mode and the second operating mode, for powering up.

According to a preferred embodiment of the present invention, the agreement by which the switch will switch the device between the first operating mode and the second operating mode includes a definition of at least one time slot of a communication cycle in which ASC data frames are transmitted. In addition, the agreement may also include a definition of one or more predetermined events as a result of which ASC data frames are transmitted. The switch will thus switch the device depending on the prevailing time slot and/or an event occurring between the first and second operating modes.

According to another embodiment, the agreement specifies in which predetermined time slot(s) and/or depending on which predetermined event(s) the particular switch will switch a predetermined number of devices to the second operating mode and which of these devices will have an exclusive transmission authorization in one or more subsequent time slots.

According to another embodiment, the agreement is designed at least partially as part of a control program storable in the particular device and/or at least partially as part of an agreement message transmissible over the CAN bus.

In addition, it is proposed that in the second transmission protocol, time slots for the transmission of data frames, in particular ASC data frames, are predetermined, in which at least one predetermined device, a predetermined number of devices or all devices are able to send or receive.

In particular, time slots for transmission of data frames defined in TTCAN (time triggered CAN) are predetermined in the second transmission protocol. Due to the configuration of the predetermined time slots in the second operating mode, it is advantageously possible to achieve guaranteed response times on the CAN bus. The agreement is advantageously configured as at least one time slot defined in TTCAN or is integrated into at least one time slot defined in TTCAN. The second operating mode is preferably prioritized over the first operating mode.

According to another preferred embodiment of the present invention, a device transmitting in the second operating mode using the second physical protocol is suitable for establishing a point-to-point connection or a point-to-multipoint connection on the CAN bus for a predetermined number of receiving devices without using CAN bit arbitration.

The CAN controller advantageously transmits the CAN data frames over the CAN bus using a first bus clock in the first operating mode, and the ASC interface unit transmits the ASC data frames over the CAN bus in the second operating mode using a second bus clock rate, the second bus clock rate being higher than the first bus clock rate. The second bus clock rate is preferably higher than the first bus clock rate by a factor between 2 and 10, preferably between 5 and 10, more preferably between 8 and 10.

In addition, a CAN data frame and an ASC data frame each have a header portion and a useful data portion, the header portion of the ASC data frame being smaller than the header portion of the CAN data frame. The header portion of the ASC data frame is preferably smaller than the header portion of the CAN data frame by a factor between 2 and 5, preferably between 3 and 5, more preferably between 4 and 5.

According to particularly preferred uses of the present invention, the at least two devices coupled by the CAN bus include either one test device and at least one control unit of a motor vehicle or at least two control units.

BRIEF DESCRIPTION OF THE DRAWINGS

Preferred exemplary embodiments of the present invention are depicted in the figures and explained in greater detail below.

DETAILED DESCRIPTION OF EXAMPLE EMBODIMENTS

Figure 1:
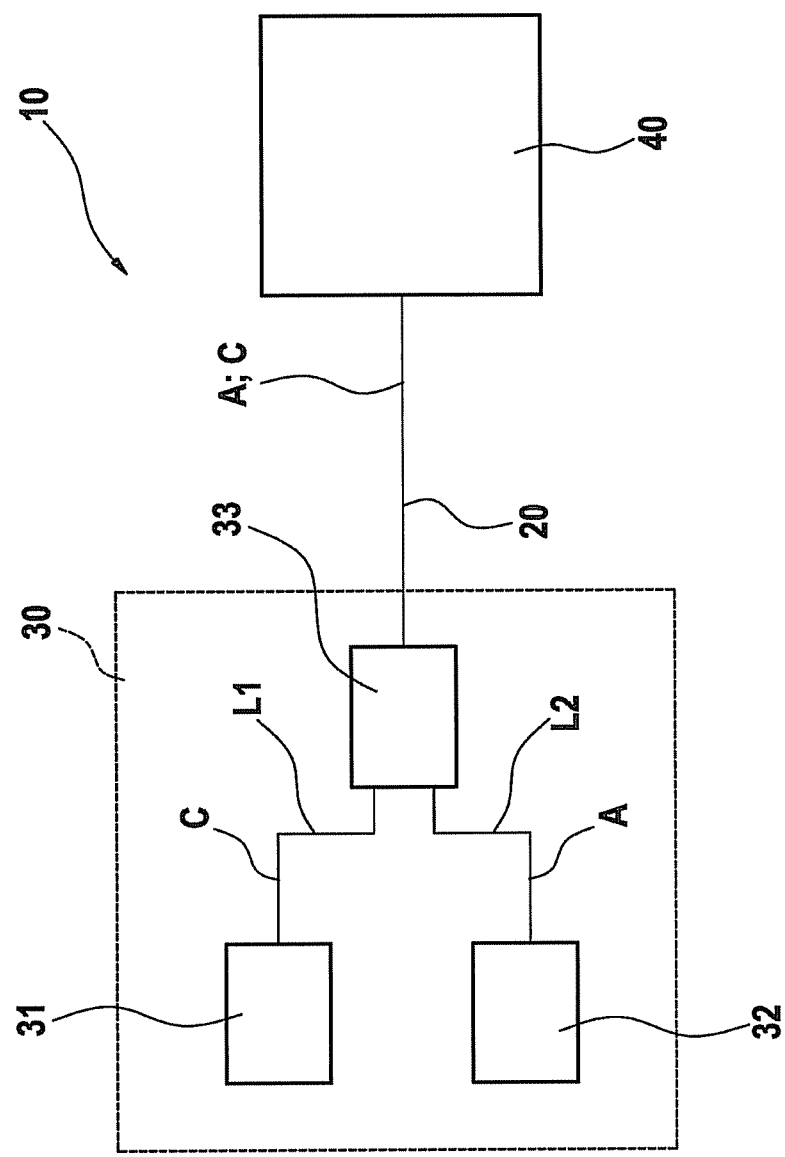
FIG. 1 shows a schematic block diagram of a first preferred exemplary embodiment of the communication system according to the present invention.

The same reference numerals in the figures denote the same components or those having the same function.

FIG. 1 shows an example communication system according to the present invention labeled with reference numeral 10 in its entirety. Communication system 10 includes a CAN bus 20, at least two devices 30, 40 (so-called nodes) linked by CAN bus 20 and a switch 33.

The at least two devices 30, 40 linked by CAN bus 20 include, for example, either one test device and at least one control unit or at least two control units. The test device is preferably provided in a workshop. The control devices are preferably provided in a motor vehicle. The present invention may of course also be used in other fields outside of a motor vehicle, for example, in aircraft, space vehicles, or machine tools.

Figure 2:
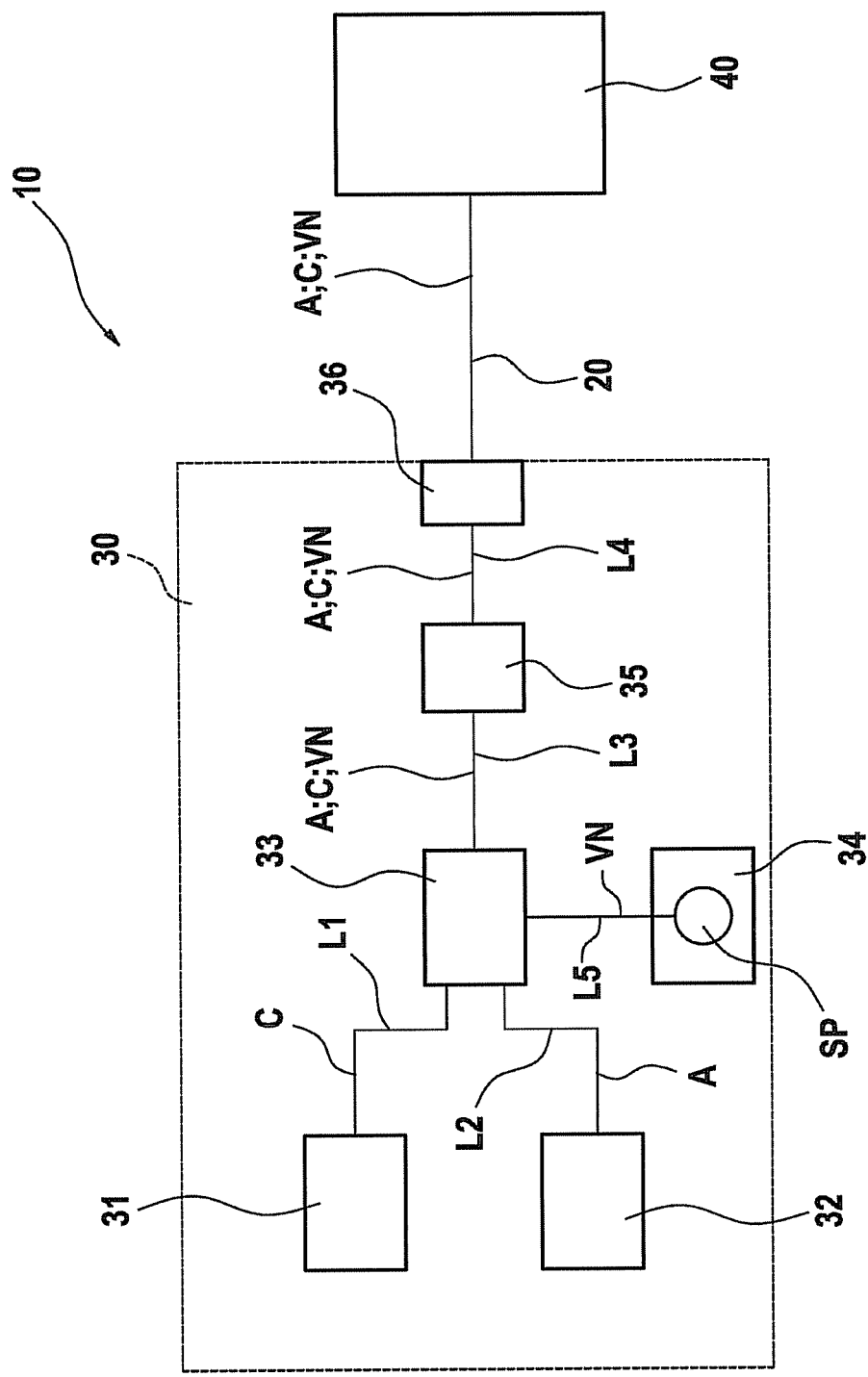
FIG. 2 shows a schematic block diagram of a second preferred exemplary embodiment of a communication system according to the present invention.

In FIGS. 1 and 2, reference numerals 30 and 40, for example, denote two control units, which are designed to be identical. For reasons of simplicity, only first control unit 30 is shown in detail. However, second control unit 40 may also be designed accordingly without going into greater details.

First controller 30 has a so-called CAN controller 31, an asynchronous serial communication (ASC) interface unit 32 (so-called ASC controller) and switch 33. Switch 33 and CAN controller 31 are linked by a first line L1. CAN controller 31 is also equipped to transmit CAN data frames C over CAN bus 20 using a first physical protocol in a first operating mode or transmission mode. To do so, CAN controller 31 transmits CAN data frames C over first line L1 to switch 33, which may then transmit received CAN data frames C to second control unit 40 over CAN bus 20. The same thing applies accordingly for receiving CAN data frames C transmitted over CAN bus 20 by CAN controller 31.

ASC interface unit 32 is linked by a second line L2 to switch 33. ASC interface unit 32 is equipped to transmit ASC data frames A over CAN bus 20 using a second physical protocol in a second operating mode. To do so, ASC interface unit 32 transmits ASC data frames A over second line L2 to switch 33, which may then transmit received ASC data frames A to second control unit 40 over CAN bus 20. The same thing applies accordingly for receiving ASC data frames A transmitted over CAN bus 20 by ASC interface unit 32.

Switch 33 is equipped to switch between the first operating mode and the second operating mode, depending on at least one agreement in effect between first control unit 30 and at least one additional device, i.e., second control unit 40 according to the examples from FIGS. 1 and 2. The agreement preferably includes a definition specifying in which predetermined time slots and/or depending on which predetermined event(s) a particular switch 33 of a predetermined number of devices, for example, both control units 30, 40 according to the exemplary embodiments from FIGS. 1 and 2 will switch a particular device 30, 40, to the first operating mode or to the second operating mode. Furthermore, the agreement may include a definition specifying in which predetermined time slot(s) and/or depending on which predetermined event(s) a particular switch 33 of a predetermined number of devices, for example, both control units 30, 40 according to the exemplary embodiments from FIGS. 1 and 2 will switch a particular device 30, 40 to the second operating mode or to the second operating mode and which of control units 30, 40 will receive an exclusive transmission authorization in one or more subsequent time slots of the communication cycle (so-called basic cycle). In particular, the agreement may also be embodied as at least one time slot defined in TTCAN or integrated into at least one time slot defined in TTCAN. TTCAN denotes a so-called "time-triggered communication on CAN." TTCAN relies on the CAN bus as its own protocol and allows a chronological sequence control of data transmission over the CAN bus, in particular a real-time control of the communication system, over higher protocol levels.

In addition, the second operating mode is preferably prioritized with respect to the first operating mode, i.e., particular switch 33 will always switch to the second operating mode according to a predetermined specification, if allowed by the technical boundary conditions.

In addition, a device transmitting in the second transmission protocol, e.g., first control unit 30, is suited or equipped via the second physical protocol to embody a point-to-point connection or a point-to-multipoint connection or to prevent asymmetrical delays on CAN bus 20 for a predetermined number of receiving devices, for example, second control unit 40 and additional devices (not shown).

CAN controller 31 preferably transmits CAN data frames C over CAN bus 20 at a first bus clock rate in the first operating mode. Furthermore, ASC interface unit 32 transmits ASC data frames A over CAN bus 20 at a second bus clock rate in the second operating mode. The second bus clock rate is preferably higher than the first bus clock rate, so that the average transmission rate over CAN bus 20 may be increased. In particular, the second bus clock rate is higher than the first bus clock rate by a factor between 2 and 10, preferably between 5 and 10, more preferably between 8 and 10.

FIG. 2 shows a schematic block diagram of a second preferred exemplary embodiment of communication system 10 according to the present invention. The second exemplary embodiment differs from the first exemplary embodiment shown in FIG. 1 in that a driver device 35 and an interface device or communication interface 36 are provided between CAN bus 20 and particular switch 33. Driver device 35 is connected to switch 33 by a third line L3 and to interface device 36 by a fourth line L4. Interface device 36 is also linked by CAN bus 22 to second control unit 40 and/or additional control units (not shown) or a test device (not shown).

Driver device 35 is embodied in particular as a CAN driver, which enables a bidirectional connection to interface device 36 at the desired levels.

Switch 33 is embodied in particular as a program-controlled interface switch or as a multiplexer, which enables switching between CAN controller 31 and ASC interface unit 32. In addition, according to FIG. 2, the agreement by which the devices are switched between the first and second operating modes may be embodied at least partially as part of an agreement message VN, which may be saved in particular device 30, 40, namely in first control unit 30 in the example from FIG. 2. For storing control program SP, for example, a memory device 34 is integrated into particular control units 30. Memory device 34 is embodied, for example, as a RAM memory or as an EEPROM memory. The control program is programmed to execute the example method according to the present invention and coordinates and controls the sequence of the method according to the present invention when run on a computer, in particular on a microprocessor (not shown) of particular device 30 and/or switch 33.

Figure 3:
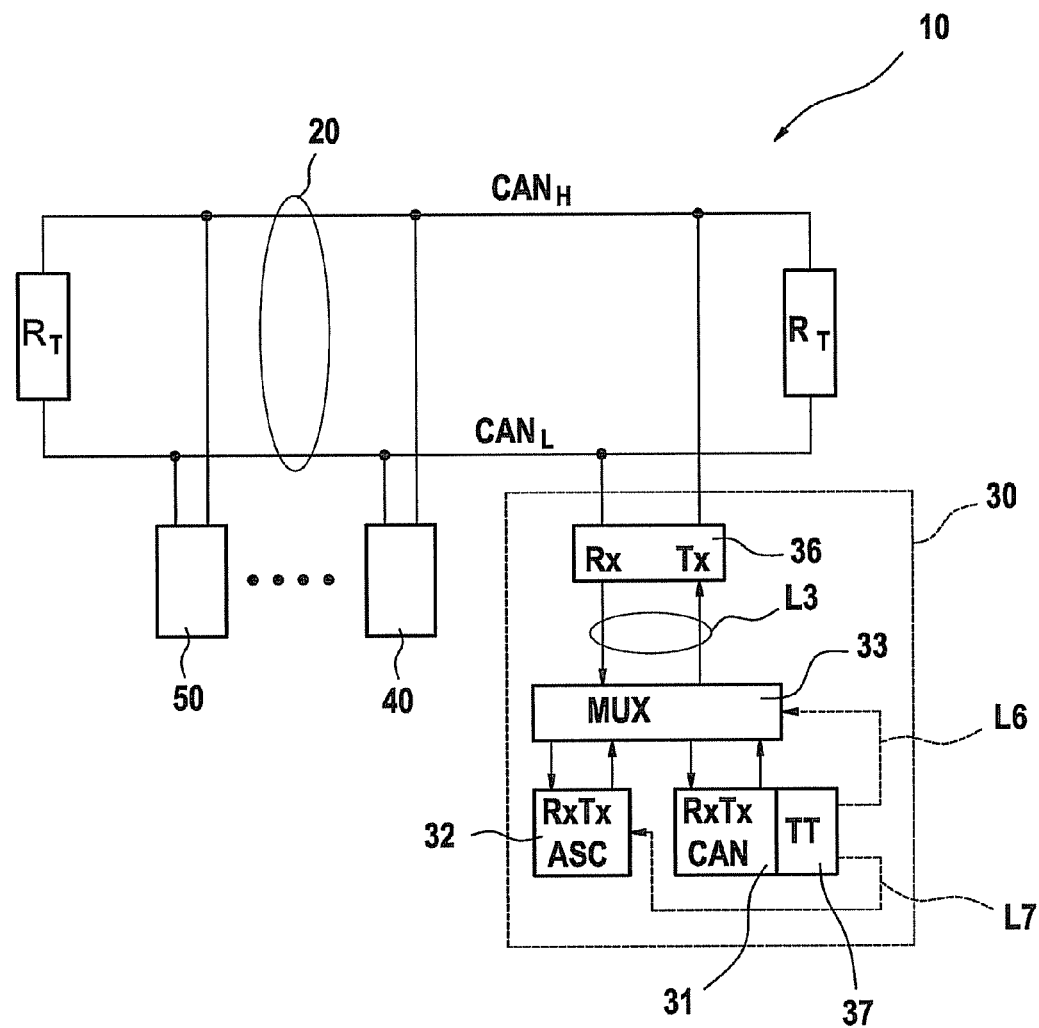
FIG. 3 shows a schematic block diagram of a third preferred exemplary embodiment of a communication system according to the present invention.

FIG. 3 shows a third exemplary embodiment of a communication system 10 according to the present invention. It shows two lines CAN_High ($CAN_H$) and CAN_Low ($CAN_L$) of CAN bus 20. Lines $CAN_H$ and $CAN_L$ are interconnected at the ends by so-called terminating resistors $R_T$. In addition to having two devices 30, 40, system 10 also has other devices, only device 50 of which is shown as an example. Here again, at least one additional device 40, 50 is designed like device 30 having CAN controller 31, ASC controller 32 and switch 33 to enable asynchronous serial communication over CAN bus 20 between these devices 30 and 40, 50 in selected time slots. TTCAN protocol 37 is adapted to the CAN protocol, which is illustrated in FIG. 3 by TTCAN protocol 37 appended to CAN controller 31. A connecting line L6 is formed between CAN controller 31 and switch 33, and a line L7 is formed between CAN controller 31 and ASC controller 32. Lines L6 and L7 are used for triggering switch 33 and/or ASC controller 32 via TTCAN protocol 37. CAN controller 32 is triggered internally without additional lines between protocol 37 and CAN controller 31.

Figure 4A:
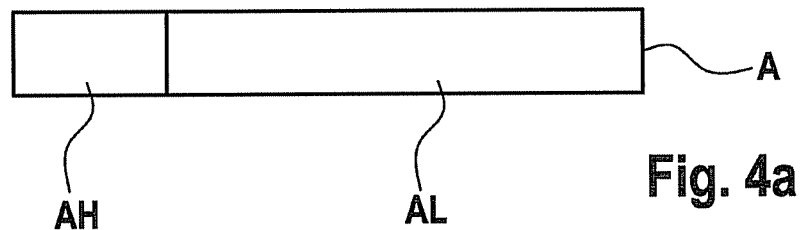
FIG. 4a shows a schematic block diagram of a preferred exemplary embodiment of an ASC data frame.
Figure 4B:
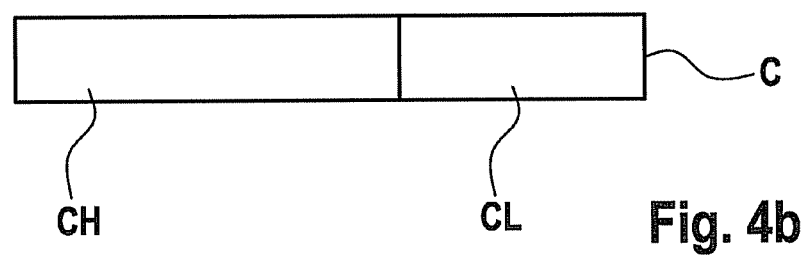
FIG. 4b shows a schematic block diagram of a preferred exemplary embodiment of a CAN data frame.

FIG. 4a shows a schematic block diagram of an exemplary embodiment of an ASC data frame A, and FIG. 4b shows a schematic block diagram of an exemplary embodiment of a CAN data frame C. CAN data frame C and ASC data frame A each have a header part CH, AH, and a useful data part CL, AL. Header part AH of ASC data frame A is smaller than header part CH of CAN data frame C. This allows useful data part AL of ASC data frame A to be larger than useful data part CL of CAN data frame C. An increase in data transmission rate is thus achieved through the option of transmission of ASC data frames A over CAN bus 20 in defined time slots of the communication cycle according to the present invention. Header part AH of ASC data frame A is preferably smaller than header part CH of CAN data frame C by a factor between 2 and 5, preferably between 3 and 5, more preferably between 4 and 5.

Figure 5:
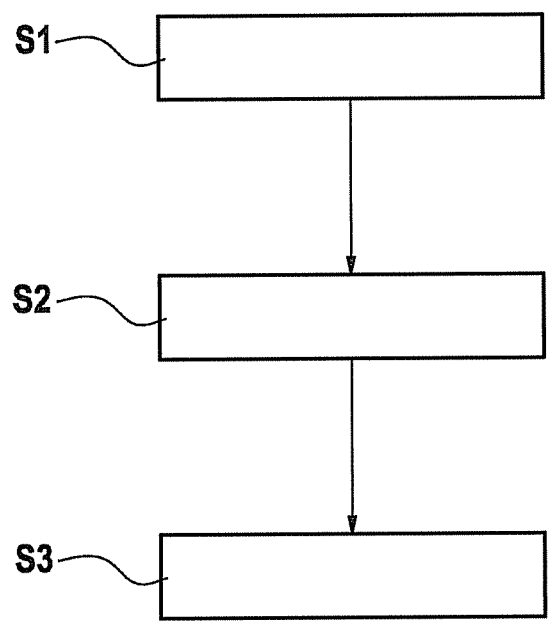
FIG. 5 shows a schematic flow chart of a method for transmitting ASC data frames over a CAN bus of a communication system.

FIG. 5 shows a schematic flow chart of a method for transmitting ASC data frames A over a CAN bus 20 in selected time slots of the communication cycle of a communication system 10. This method is explained in greater detail below with reference to communication system 10 shown in FIG. 3.

In a first method step S1, particular device 30, 40, 50 is equipped with CAN controller 31. CAN controller 31 is equipped to transmit CAN data frames C over CAN bus 20 using a first physical protocol in a first operating mode.

In a second method step S2, particular device 30, 40, 50 is equipped with asynchronous serial communication (ASC)

interface unit 32 (ASC controller). ASC unit 32 is equipped to transmit ASC data frames A over CAN bus 20 using a second physical protocol in a first operating mode.

In a third method step S3, a predetermined number of devices 30, 40, 50 is switched between the first operating mode and the second operating mode, depending on at least one agreement in effect between the predetermined number of devices 30, 40, 50. Switching between the first and second operating modes is preferably accomplished by switch 33.

According to the present invention, data are transmitted over CAN bus 20 in the following manner: another protocol layer, so-called TTCAN protocol 37, is added to the CAN protocol. In TTCAN, data are transmitted over CAN bus 20 in recurring communication cycles (so-called basic cycles) in a time-controlled and deterministic method. One communication cycle is subdivided into multiple time slots, one of devices 30, 40 connected to CAN bus 20 receiving exclusive transmission authorization in each time slot. It is possible to predict at any time when a certain device 30, 40 will next be allowed to transmit a message. Access authorization of individual devices 30, 40, i.e., when each device 30, 40 will be allowed to transmit, is defined in a matrix, the content of which is stored in individual devices 30, 40.

To implement asynchronous data transmission over CAN bus 20, at least one time slot of the communication cycle is defined as an ASC slot, in which ASC data frames A may be transmitted. Theoretically, except for the time slot for the reference messages, all the time slots of a communication cycle may be defined as ASC slots and used for an ASC communication. TTCAN controller 37 controls switch 33 over line L6 to switch between CAN controller 31 and ASC interface unit 32. Depending on the switch position of switch 33, data of CAN controller 31 or of ASC controller 32 are applied to CAN bus 20 for transmission to other devices, or the data received by CAN bus 20 are relayed to CAN controller 31 or to ASC controller 32 for further processing. TTCAN protocol 37 also activates and/or deactivates CAN controller 31 and/or, on line L7, ASC controller 32. In particular during the ASC time slots, the device is switched to ASC interface unit 32. During the other time slots, communication system 10 is switched to CAN controller unit 31 and behaves like an entirely normal TTCAN communication system. The possibility of ASC communication over CAN bus 20 requires an expansion of the previous traditional TTCAN protocol.

During the ASC slot, the CAN controller must not see the ASC data frames A. For this reason, error detection of CAN is deactivated during the ASC time slot. The CAN protocol controller sees only "1" on CAN bus 20, which corresponds to a bus-idle state. During the ASC slot, serial communication over CAN bus 20 then takes place.

The present invention relates to the case when one controller 30, 40 temporarily fails or is powered down during operation of communication system 10 and must be reset or powered up again. This is in particular an interference-free integration of nodes temporarily shut down in a running communication system 10. During the reset or power-up procedure, this device must first be resynchronized with the entire network. To this end, the device listens in on CAN bus 20 and waits for a so-called reference message containing time information. The reference message is transmitted over bus 20 at the beginning of a communication cycle by one device 30, 40, which embodies the current so-called actual time master. However, the unsynchronized device does not have any time information and thus cannot be switched from the TTCAN controller to the ASC interface unit even for the duration of the ASC slot. Nor can the error detection of CAN be deactivated during the ASC slot. As a result, device 30, 40, which is reset or powered up again, must be operated exclusively in the first operating mode and is not switched to the second operating mode during the ASC slot. Consequently, the CAN controller sees ASC data frames A, stops them for defective CAN data frames, and an error counter is incremented. Furthermore, device 30, 40 will destroy ASC data frames A, as defined in the CAN protocol, in reception of defective CAN data frames C. Ultimately, device 30, 40 results in sensitive interference in communication over communication system 10 and cannot be synchronized with the overall network at all or only with a limited functionality (authorization only to receive, no authorization to transmit). The same problems may also occur when an entire communication system 10 is powered up and it is necessary to explain which time master and/or backup time master is transmitting the reference messages (time information) and multiple devices must be synchronized to the predetermined time. The present invention is able to remedy this situation.

According to the present invention, it is proposed that a device 30, 40, which is reset or powered up, is switched during the resynchronization operation to a third operating mode (so-called restricted mode), in which the error counters (Tx error counter and/or Rx error counter) of device 30, 40 are frozen, and the transmission of dominant error frames by device 30, 40 is inactivated or blocked. However, device 30, 40 may transmit a CAN message, in particular an acknowledgment message (ACK) in the third operating mode when it has heard an error-free CAN data frame C on CAN bus 20. Furthermore, it is possible that device 30, 40 may transmit a CAN message, in particular a reference message (REF) over CAN bus 20 in the third operating mode when device 30, 40 has not received any reference message (REF) from other devices 30, 40 connected to CAN bus 20 within a predefined period of time, in particular within one communication cycle of CAN bus 20.

A software approach or a hardware approach is possible for switching device 30, 40, which is reset or powered up to the third operating mode. In the software approach, a certain bit (so-called configuration bit) may be set by CAN controller 31 during the synchronization of device 30, 40. In the hardware approach, switching between the third operating mode and other operating modes (e.g., the first or second operating modes) may be linked to the operating state (so-called sync mode) of device 30, 40. According to the TTCAN protocol, the "Sync_Off," "Synchronizing," "In_Gap" and "In_Schedule" states may be defined as operating states of device 30, 40. Device 30, 40 is preferably switched to the third operating mode when device 30, 40 is in an operating state of Sync_Mode="Sync_Off" or Sync_Mode="Synchronizing." In addition, device 30, 40 is switched to an operating mode different from the third operating mode when device 30, 40 is in an operating state of Sync_Mode="In_Gap" or Sync_Mode="In_Schedule."

An expansion of the previous traditional TTCAN protocol by a few functions is required to implement interference-free integration of nodes 30, 40, which are temporarily shut down, in a running multiplex communication system 10. Nodes 30, 40 having an expanded TTCAN protocol may be operated in normal CAN and TTCAN systems 10. If the new expanded protocol functions are temporarily shut down or deactivated, a standardized CAN conformance test (ISO 16845) may be run. In multiplex systems 10, communication does not require intervention into the application software, so the application CPU is relieved of time-critical tasks that recur frequently.

In the newly defined third (restricted) operating mode, a TTCAN node 30, 40 may transmit only so-called reference messages and acknowledgment messages (acknowledge bits).

Regardless of the status of the error counter, error frames may be transmitted only with a passive error flag, while overload frames, like error frames, may be transmitted with a passive error flag instead of the overload flag. The error counters are neither incremented nor decremented in restricted operating mode. This is a significant difference in comparison with the previous CAN standard (ISO 11898-1) and TTCAN standard (ISO 11898-4).

It is proposed in particular that a frame synchronization entity (FSE) of the TTCAN protocol shall be supplemented by a function. In addition to the TTCAN triggers for CAN messages, a switch signal, configured by time marks and based on the cycle time of the TTCAN protocol, is generated, and switches switch 30 (the multiplexer) of the transceiver between CAN and ASC, on the one hand, and switches TTCAN nodes 30, 40 for the time phases during which the asynchronous serial communication over CAN bus 20 is active, to the third (restricted) operating mode, on the other hand. Optionally, the transceiver itself may also be switched to allow higher bit rates in ASC operation, for example.

The present invention ensures that a TTCAN node 30, 40 which is to be synchronized with a running TTCAN multiplex system 10, understands all CAN messages and/or CAN data frames C and ignores all ASC messages and/or ASC data frames A. As soon as node 30, 40 is adequately synchronized, i.e., has received at least two successive references messages, it may also transmit other messages and may also participate in asynchronous serial communication in the ASC time slots.

The third (restricted) operating mode described here may also be used in a pure CAN multiplex system, and then switching must be performed by other means, e.g., by the application software.

Figure 6:
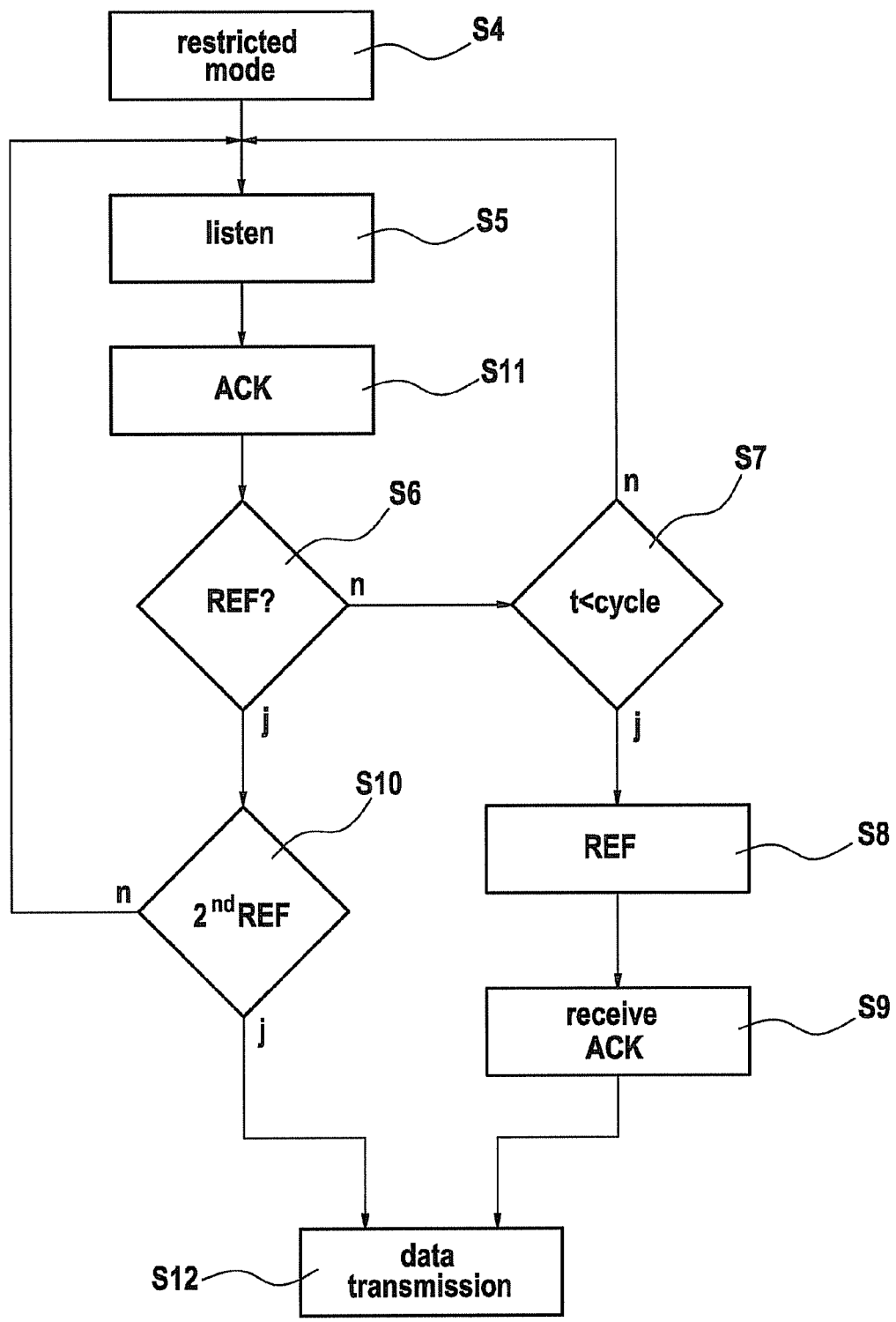
FIG. 6 shows a schematic flow chart of a preferred exemplary embodiment of the method according to the present invention.

FIG. 6 shows a schematic flow chart of a preferred embodiment of the method according to the present invention. The method is explained in greater detail below with reference to communication system 10 shown in FIG. 3.

In a first method step S4, one of devices 30, 40, 50, which has been temporarily shut down and is to be integrated into running communication system 10, is switched to the third (restricted) operating mode. This causes device 30, 40, 50 to understand all CAN messages C and to ignore all ASC messages A in synchronization with running communication system 10. Switching of device 30, 40, 50 to the third operating mode may be accomplished on the basis of a configuration bit of CAN controller 31 as a function of the operating state of the device.

In a second method step S5, device 30, 40, 50 listens in on CAN bus 20 and waits for CAN messages C, in particular reference messages REF, which indicate the beginning of a communication cycle. ASC messages A are ignored by device 30, 40, 50 because it is in the third operating mode. When device 30, 40, 50 has received a CAN message, it transmits an acknowledgment message ACK over CAN bus 20 during the third operating mode in a subsequent method step S11 to acknowledge proper reception of the message, in particular to notify the current time master of the proper reception of the time information. Each error-free CAN message received is acknowledged with an ACK bit in the restricted mode, whether it is a reference message REF, a calibration message or any other message.

In a subsequent query step S6, there is a check on whether or not a reference message REF has been received. If not, then in another query step S7, there is a check on whether a predetermined period of time, preferably time (t) of one communication cycle (cycle) has already elapsed. If not, the program again branches off to method step S5 and CAN bus 20 is listened in on again.

If it is found in query step S7 that the time of one communication cycle has already elapsed, then it may be assumed that either no other device is connected to CAN bus 20 or the other connected devices are not time masters, i.e., they are unable to specify time information. Therefore, in a method step S8, device 30, 40, 50 itself attempts to assume the time master function and to transmit a reference message REF itself. As soon as device 30, 40, 50 then receives an acknowledgment message ACK in method step S9 from one of the other devices connected to CAN bus 20 (after this device has received reference message REF), it knows that it is currently the time master.

If it is found in query step S6 that a reference message REF has been received, then in a subsequent query step S10, there is a check on whether this is already the second successively received reference message REF. If not, the system branches off again to method step S5 and again listens in on CAN bus 20. However, if the CAN message received in method step S5 is already a second successive reference message REF, then the system switches to the normal operating mode for data transmission in a method step S12.

In method step S12, there is a data transmission over CAN bus 20 in such a manner that data are transmitted in the time slot of the communication cycle according to the CAN protocol (in the first operating mode) and in selected time slots of the communication system data are not transmitted according to the CAN protocol but instead are transmitted asynchronously and serially (in the second operating mode), under some circumstances even at a higher bus clock rate. Device 30, 40, 50, which has been integrated into running communication system 10, operates either as a normal node (left path of the flow chart from FIG. 6) or as a time master node (right path).

What is claimed is:

1. A communication system, comprising:
   a CAN bus;
   at least two devices interconnected via the CAN bus, at least one of the devices including:
      a CAN controller adapted to CAN data frames over the CAN bus using a first physical protocol in a first operating mode;
      an asynchronous serial communication interface unit adapted to transmit ASC data frames over the CAN bus using a second physical protocol in a second operating mode;
      a first switch adapted to switch between the first operating mode and the second operating mode, as a function of at least one agreement in effect between the device and at least one other device; and
      a second switch adapted to switch the device to a third operating mode, which is different from the first operating mode and the second operating mode, for powering up the device, wherein in the third operating mode the device is prevented from participating in ASC-based communication over the CAN bus.

2. The communication system as recited in claim 1, wherein an error counter of the device is stopped in the third operating mode and neither error frames nor overload frames are transmitted at a dominant bus level.

3. The communication system as recited in claim 1, wherein the device, in the third operating mode, is adapted to listen in on the CAN bus for CAN messages for reference messages from other devices connected to the CAN bus.

4. The communication system as recited in claim 3, wherein the device, in the third operating mode, is adapted to transmit a CAN acknowledgment message, if it has heard an error-free CAN data frame on the CAN bus.

5. The communication system as recited in claim 1, wherein the second switch is adapted to automatically switch the device to the third operating mode, as a function of an operating state of the device.

6. The communication system as recited in claim 5, wherein the second switch is adapted to switch the device to the third operating mode when the device is in an operating state of Sync_Mode=Sync_Off or Sync_Mode=Synchronizing.

7. The communication system as recited in claim 5, wherein the second switch is adapted to switch the device to the first or second operating mode when the device is in an operating state of Sync_Mode=In_Gap or Sync_Mode=In_Schedule.

8. The communication system as recited in claim 1, wherein:
the at least one of the devices is configured to switch out of the third operating mode after successfully synchronizing with another of the at least two devices over the CAN bus.

9. A communication system, comprising:
a CAN bus;
at least two devices interconnected via the CAN bus, at least one of the devices including:
a CAN controller adapted to CAN data frames over the CAN bus using a first physical protocol in a first operating mode;
an asynchronous serial communication interface unit adapted to transmit ASC data frames over the CAN bus using a second physical protocol in a second operating mode;
a first switch adapted to switch between the first operating mode and the second operating mode, as a function of at least one agreement in effect between the device and at least one other device; and
a second switch adapted to switch the device to a third operating mode, which is different from the first operating mode and the second operating mode, for powering up the device;
wherein the device, in the third operating mode, is adapted to transmit a CAN reference message over the CAN bus if it has not received any reference message from other devices connected to the CAN bus within one communication cycle of the CAN bus.

10. A communication system, comprising:
a CAN bus;
at least two devices interconnected via the CAN bus, at least one of the devices including:
a CAN controller adapted to CAN data frames over the CAN bus using a first physical protocol in a first operating mode;
an asynchronous serial communication interface unit adapted to transmit ASC data frames over the CAN bus using a second physical protocol in a second operating mode;
a first switch adapted to switch between the first operating mode and the second operating mode, as a function of at least one agreement in effect between the device and at least one other device; and
a second switch adapted to switch the device to a third operating mode, which is different from the first operating mode and the second operating mode, for powering up the device;
wherein the second switch is adapted to switch the device to the third operating mode via a special configuration bit.

11. A method for operating a communication system having a CAN bus and at least two devices interlinked via the CAN bus, the method comprising:
switching at least one of the devices between different operating modes;
transmitting, by a CAN controller of one of the devices, CAN data frames over the CAN bus in a first operating mode using a first physical protocol;
transmitting by an asynchronous serial communication interface unit of the device ASC data frames over the CAN bus using a second physical protocol in a second operating mode; and
switching the device to a third operating mode, which is different from the first operating mode and the second operating mode, for powering up the device, wherein in the third operating mode the device is prevented from participating in ASC-based communication over the CAN bus.

12. The method as recited in claim 11, further comprising:
during the third operating mode, synchronizing with another device on the CAN bus; and
after successfully synchronizing with another of the at least two devices over the CAN bus, switching out of the third operating mode.

* * * * *